US012472516B2

(12) United States Patent
Mlakar et al.

(10) Patent No.: US 12,472,516 B2
(45) Date of Patent: Nov. 18, 2025

(54) ILLUMINATION DEVICE FOR A SPRAY GUN AND SPRAY GUN HAVING SUCH AN ILLUMINATION DEVICE

(71) Applicant: GEMA SWITZERLAND GMBH, St. Gallen (CH)

(72) Inventors: Roman Mlakar, Kreuzlingen (CH); Marco Sanwald, Abtwil (CH)

(73) Assignee: GEMA SWITZERLAND GMBH, Gossau (CH)

( * ) Notice: Subject to any disclaimer, the term of this patent is extended or adjusted under 35 U.S.C. 154(b) by 332 days.

(21) Appl. No.: 18/253,026

(22) PCT Filed: Nov. 10, 2021

(86) PCT No.: PCT/EP2021/081256
§ 371 (c)(1),
(2) Date: May 15, 2023

(87) PCT Pub. No.: WO2022/101272
PCT Pub. Date: May 19, 2022

(65) Prior Publication Data
US 2024/0001379 A1 Jan. 4, 2024

(30) Foreign Application Priority Data
Nov. 16, 2020 (DE) ..................... 10 2020 130 197.9

(51) Int. Cl.
*B05B 5/053* (2006.01)

(52) U.S. Cl.
CPC .................................. *B05B 5/0533* (2013.01)

(58) Field of Classification Search
CPC . B05B 5/0533; F21V 33/0064; F21V 33/0084
See application file for complete search history.

(56) References Cited

U.S. PATENT DOCUMENTS 5,039,019 A 8/1991 Weinstein et al.
5,873,647 A * 2/1999 Kurtz ........................ B24C 5/02 362/101

(Continued)

FOREIGN PATENT DOCUMENTS

CN 201878412 U 6/2011
CN 202113973 U 1/2012

(Continued)

OTHER PUBLICATIONS

International Preliminary Report on Patentability dated May 25, 2023, for corresponding PCT Application No. PCT/EP2021/081256.

(Continued)

*Primary Examiner* — Steven M Cernoch
(74) *Attorney, Agent, or Firm* — Kinney & Lange, P.A.

(57) ABSTRACT

A spray gun, in particular a powder spray gun, has a handle part and a gun barrel connected to the handle part. The spray gun further includes an illumination device for continuously or optionally illuminating and/or lighting at least one region of an object to be coated by the spray gun. The illumination device is detachably and in particular exchangeably connected to the spray gun and has a ring-shaped lighting means carrier with at least one lighting means, in particular in the form of an LED. The lighting means carrier extends around a downstream region of the gun barrel, on which it is radially supported.

12 Claims, 2 Drawing Sheets

(56) References Cited

U.S. PATENT DOCUMENTS

| | | | |
|---|---|---|---|
| 9,409,196 B1 | 8/2016 | Lucas | |
| 10,539,318 B2 | 1/2020 | Fulkerson et al. | |
| 2006/0201016 A1* | 9/2006 | Nakagawa ............ | B05B 5/0255 34/96 |
| 2009/0092764 A1 | 4/2009 | Hoeckelman | |
| 2016/0167070 A1 | 6/2016 | Chiu | |
| 2016/0368005 A1 | 12/2016 | Pajel et al. | |

FOREIGN PATENT DOCUMENTS

| | | |
|---|---|---|
| CN | 205217185 U | 5/2016 |
| DE | 2749400 A1 | 5/1978 |
| DE | 10202711 A1 | 7/2003 |
| DE | 602004001336 T2 | 8/2006 |
| DE | 102018103507 A1 | 8/2019 |
| EP | 2408568 B2 | 12/2019 |
| WO | 2008127227 A1 | 10/2008 |

OTHER PUBLICATIONS

First German Office Action dated Jul. 7, 2021, for corresponding German Application No. 10 2020 130 197.9.

International Search Report and Written Opinion dated Feb. 24, 2022, for corresponding PCT Application No. PCT/EP2021/081256.

Second German Office Action dated Mar. 24, 2023, for corresponding German Application No. 10 2020 130 197.9.

* cited by examiner

ILLUMINATION DEVICE FOR A SPRAY GUN AND SPRAY GUN HAVING SUCH AN ILLUMINATION DEVICE

CROSS-REFERENCE TO RELATED APPLICATION(S)

This application is the national phase of PCT Application No. PCT/EP2021/081256 filed on Nov. 10, 2021, which claims priority to German Application No. 102020130197.9 filed on Nov. 16, 2020, the contents of which are incorporated herein by reference in their entirety.

BACKGROUND

The present disclosure relates in general to the technical field of spray coating objects or articles.

One aspect of the present disclosure relates in particular to a spray gun for the preferably manual spray coating of objects with powdered coating material. However, the present disclosure is not limited thereto but can also be used with spray guns for automatically spray coating objects, in particular for spray coating objects with liquid coating material.

The present disclosure relates in particular to a spray gun, particularly a powder spray gun, wherein the spray gun comprises a handle member and a gun barrel connected to the handle member.

Spray guns of this type are already known at least in principle from the prior art. For example, printed publication EP 0 383 030 A1 relates to a spray gun for spray coating objects with coating powder. The spray gun known from this prior art has a handle member and a gun barrel connected to the handle member.

Essential when spray coating objects is achieving the most homogeneous and uniform coating possible on the object to be coated. This objective can often only be achieved with great effort, particularly in the case of complex objects having undercuts, openings or irregular surfaces.

In manual coating operations of such objects to be coated, the experience and skill of the spray gun operator is particularly important to being able to achieve the most flawless possible (optimal) coating result. The spray gun operator's experience is in particular based on "knowing" how to guide the manual spray gun relative to the object to be coated so as to maintain an even distance between the application nozzle of the spray gun and the surface of the object to be coated.

There is a fundamental need to simplify the spray coating process for the operator of a spray gun to the effect of also enabling inexperienced operators to achieve the most optimal coating result possible.

This applies in particular to applications in which the spray gun is to be operated under unfavorable lighting conditions. The problem in this case is that the working area (i.e. the surface area of the object to be coated) is not optimally illuminated, making it extremely difficult for the spray gun operator to directly assess the quality and homogeneity of the sprayed coating material while performing the work. Should a subsequent inspection under better lighting conditions expose quality defects in the coating result, a complete recoating needs to follow in order to achieve the necessary homogeneity.

Conversely, if the coating quality of the coating material could already be assessed by the spray gun operator under favorable lighting conditions when applying the coating material, this would result in considerable time and cost savings and contribute to environmental protection due to the reduced use of often environmentally harmful coating materials.

The present disclosure focuses on solving the task of developing an illumination device for supplementing a spray gun as needed, particularly also for retrofitting commercially available spray guns with such a respective illumination device. Then again, the illumination device should not impair the spray gun's ease of use.

SUMMARY

Accordingly, the present disclosure relates in particular to a spray gun, for example a powder spray gun, wherein the spray gun comprises a handle member and a gun barrel connected to the handle member. According to the present disclosure, it is particularly provided for the spray gun to further comprise an illumination device for the continuous or as required illuminating and/or lighting of at least one area of an object to be coated with the spray gun. The illumination device is detachably and in particular replaceably connected to the spray gun.

Specifically, the disclosed solution provides for the illumination device to comprise an annular illuminant carrier having at least one illuminant, particularly in the form of an LED. The illuminant carrier extends around a downstream region of the gun barrel on which it is radially supported.

The disclosed solution has various advantages. In particular, the illumination device is suited to retrofitting a conventional spray gun accordingly. The annular illuminant carrier provides a ring light which allows optimal lighting and/or illuminating of at least one area of the object to be coated. Due to the illuminant carrier extending around a downstream region of the gun barrel on which it is radially supported, no structural changes need to be made to the spray gun in order to equip it with the illumination device.

Embodiments provide for the gun barrel of the spray gun to comprise a shaft with a nozzle arranged at its downstream end region via which the coating material (such as e.g. coating powder) is atomized during the spraying process. The nozzle is preferably replaceably connected to the shaft of the gun by means of a particularly at least partially sleeve-shaped union nut.

In this embodiment, it makes sense for the area on which the annular illuminant carrier is supported to be an area of the union nut and in particular a sleeve-shaped area of the union nut. However, other embodiments are of course also conceivable here.

In order to be able to ensure optimal alignment of the illuminant carrier relative to the gun barrel, the gun barrel and in particular the union nut can comprise at least one indexing means which in particular interacts in a form-fitting manner with preferably at least one counter-indexing means of the illuminant carrier of complementary design to the indexing means so as to effect particularly a rotational alignment of the illuminant carrier with respect to the gun barrel.

Alternatively or additionally thereto, it can be provided for the annular illuminant carrier to be axially and/or radially displaceable relative to the gun barrel and able to be locked in the selected position by suitable positioning means.

Preferential implementations of the disclosed solution provide for at least one connecting bar preferably extending longitudinally in certain areas of the gun barrel which is connected on one side to the illuminant carrier and is preferably detachably connected or connectable on the other side particularly to an upstream region of the gun barrel, wherein the at least one connecting bar extends beyond the gun barrel and at least partially supports the illuminant carrier.

These implementations of the disclosed spray gun can provide for the at least one connecting bar to form an electrical connection between an electrical connector particularly on the upstream region of the gun barrel and the at least one illuminant of the illuminant carrier. The electrical connection can for example be an electrical line extending at least through sections of the at least one connecting bar.

In particular, the connecting bar can thus be of at least partially tubular design. Alternatively or additionally thereto, the connecting bar can also consist of an electrically conductive material which forms the electrical connection.

The electrical connector particularly in the upstream region of the gun barrel is galvanically connected to an adapter preferably provided in the lower region of the handle member particularly by means of an electrical line running at least through sections of the handle member.

Preferentially, a plurality of illuminants is provided, each particularly in the form of an LED, wherein the illuminants are in particular arranged in equidistant distribution around the annular illuminant carrier and oriented toward the downstream end region of the gun shaft.

Alternatively or additionally thereto, the possibility can be provided for the orientation and/or the focus of the lighting or illumination effected with the illuminants or the at least one illuminant to be on different areas of the object to be coated. The focus of the illumination can also be of preferably adjustable design (analogous to the focusing of a flashlight, for example) in order to optimally illuminate respective areas of the object to be coated at varying distances.

However, the illumination can also be fixed focus or able to be raster-focused in order to signal to the spray gun operator—even and particularly during training—the optimum distance of the spray gun from the object to be coated.

According to developments of the disclosed spray gun, a purge air device is provided for flowing compressed air around the illuminant carrier, in particular selectively or as required, particularly so as to keep the at least one illuminant of the illuminant carrier free of coating material. Since compressed air is already required to operate the spray gun, and this is usually already supplied to the spray gun, such a purge air device can be implemented without great effort.

According to implementations of the disclosed spray gun, same is designed for the electrostatic spray coating of objects and to that end comprises at least one charging electrode in order to transfer electrostatic charge to the coating material being or to be sprayed with the spray gun. The charging electrode thereby has a different electric potential than the electric potential of the object to be coated such that the charged coating material is electrostatically attracted to the object to be coated.

In this electrostatic spray coating, the coating material can be positively or negatively electrostatically charged either directly in front of the outlet opening, in particular nozzle opening, of the spray gun or past the outlet opening. The at least one charging electrode used thereto is connected to a high electrical voltage in the range of between 40 kV and 140 kV. The object to be coated has a different electric potential, preferably ground potential. The atomized coating material moves along electric flux lines generated by the high voltage between the charging electrode and the object to be coated. After a thin layer of coating material has formed on the object to be coated, the electrical charge of this layer repels subsequent coating material particles since they are equally electrostatically charged. As a result, only a limited layer thickness can be produced on the object to be coated in one operation. Furthermore, an unstable correlation of forces arises due to the mutual repulsion of the coating material particles on the surface of the object to be coated. This unstable correlation of forces can result in hindering the development of a smooth even coating surface and instead somewhat of a "hilly landscape" ensues which then forms so-called "orange peel" during the subsequent baking of the coating material and should therefore be prevented whenever possible.

Particularly the corners and edges as well as the openings of the object to be coated have a different electrostatic attraction than does its larger flat surfaces. The corners and edges are usually more poorly or less heavily coated than adjacent larger surface areas. The coating material particles fly around the outer peripheral edges and around the edges of openings of the object to be coated under the action of the electrostatic field and are then attracted to the backside of the object due to its electrostatic attraction so that the back of the object to be coated is then also coated. This can be referred to as "electrical wrap around."

Using a counter electrode, which draws off free ions from the sprayed flow of coating material, can improve the surface quality and the penetrating power of the coating material into recesses in the object to be coated. A thicker coating material layer can furthermore be applied to the object to be coated in one spraying operation without an excessive amount of coating material particles ricocheting off the object or being electrostatically repelled. An "orange peel"-like layer surface can in particular be prevented.

For this reason, further developments of the disclosed spray gun provide for the spray gun to have at least one counter electrode connected to a different electrostatic potential than the charging electrode, it being arranged in the proximity of the charging electrode, so that it absorbs at least some of the free ions generated when the coating material is electrostatically charged. In this context, it is particularly provided for the annular illuminant carrier to accommodate the at least one counter electrode.

This implementation of the present disclosure has the advantage of the illuminant carrier thus being accorded a dual function: On the one hand, the illuminant carrier serves to accommodate at least one illuminant for illuminating or lighting at least one area of the object to be illuminated continuously or as required. On the other hand, the illuminant carrier serves to accommodate at least one counter electrode in order to absorb at least some of the free ions generated during the electrostatic charging of the coating material and thus improve the coating result.

According to further developments of the latter embodiment, in which the annular illuminant carrier holds the at least one counter electrode, it is provided for the at least one connecting bar extending in the longitudinal direction of the gun barrel to also serve in forming an electrical connection between a potential terminal and the at least one counter electrode.

As is also the case with respect to the illuminants, which are accommodated by the annular illuminant carrier, it is preferential for multiple counter electrodes, preferably in the form of needle electrodes, to protrude from the annular illuminant carrier.

In order for the free ions generated during the electrostatic charging of the coating material to be absorbed in the most efficient possible manner via the at least one counter electrode, there should be a smaller distance between the charging electrode and the counter electrode than the distance between the charging electrode and the object to be coated. In particular, the distance between the charging electrode and the counter electrode should be one-third to half of the distance between the charging electrode and the object to be coated.

The counter electrode is preferably arranged at a distance from a cloud of coating material atomized by the spray gun, wherein the distance between the counter electrode and the coating material cloud is smaller than the distance between the charging electrode and the object to be coated.

The present disclosure not only relates to a spray gun having a respective illumination device able to be replaceably connected to the spray gun but also to an illumination device as such for a spray gun, particularly a spray gun of the afore-mentioned type. The illumination device thus serves to illuminate and/or light at least one area of an object to be coated with the spray gun on a continuous or as required basis. The illumination device can be detachably and in particular replaceably connected to the spray gun and comprises an annular illuminant carrier having at least one illuminant, particularly in the form of an LED, wherein the illuminant carrier is designed so as to be able to extend around a downstream region of the spray gun's barrel and be radially supported on same.

The illumination device preferably has at least one connecting bar which serves to support the annular illuminant carrier when the illumination device is mounted, wherein the at least one connecting bar in particular also serves in supplying the at least one illuminant of the illuminant carrier with electrical energy.

BRIEF DESCRIPTION OF THE DRAWINGS

The following will reference the drawings in describing an exemplary embodiment of the spray gun according to the present disclosure.

Shown as.

DETAILED DESCRIPTION

Figure 1:
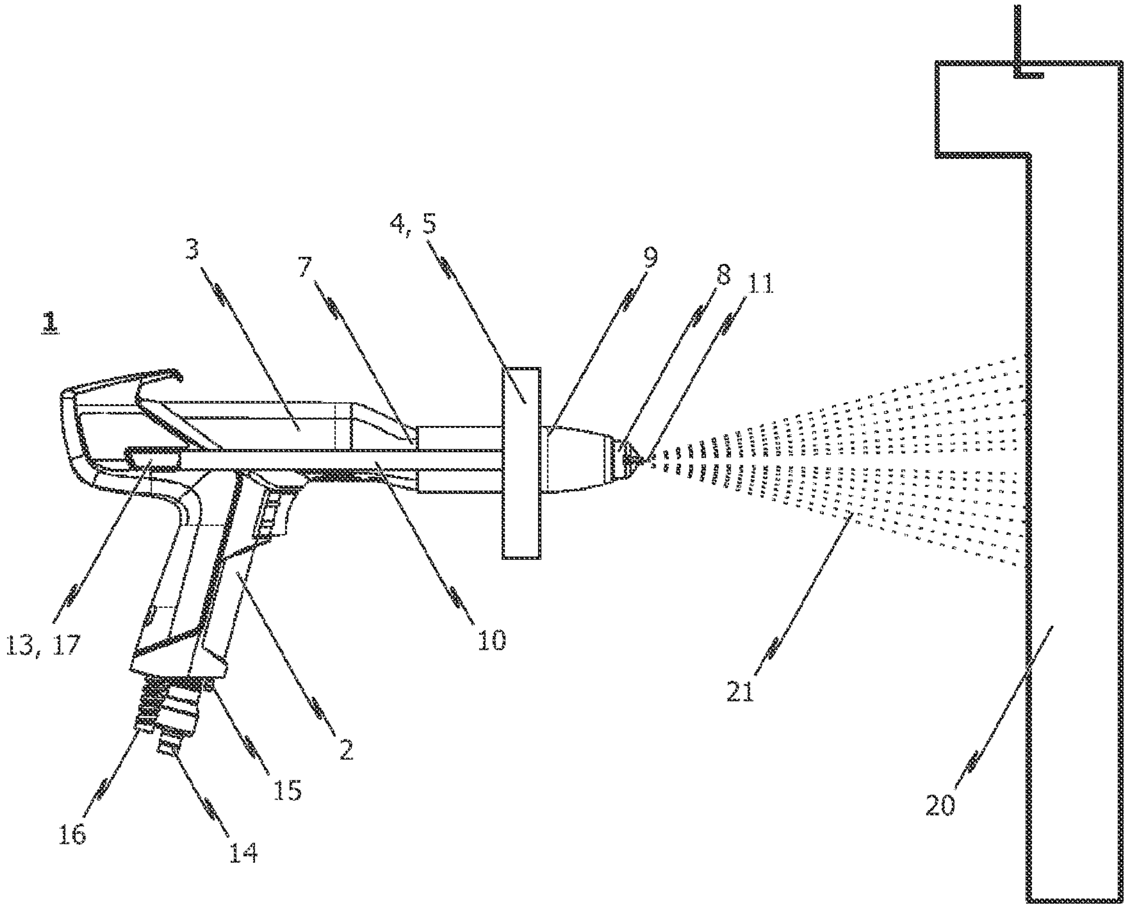
FIG. 1 a schematic and side view of an exemplary embodiment of the disclosed spray gun.

The disclosed spray gun 1, as shown schematically in the drawings on the basis of an exemplary embodiment, serves in particular in the applying of coating material 21 onto an object 20 as shown schematically in FIG. 1.

In the depicted embodiment of the disclosed spray gun 1, the coating material 21 to be applied to the object 20 is in particular electrostatically charged or chargeable coating powder.

Yet provision is also made for being able to use a spray gun 1 constructed according to the present disclosure to apply other coating materials 21 to an object 20 instead of electrostatically charged coating powder. For example, the spray gun 1 can be used to apply liquid coating materials 21 to an object 20.

The spray gun 1, as shown schematically in the drawings, essentially comprises a handle member 2 and a gun barrel 3 connected to the handle member 2.

The handle member 2, which is able be clasped by a hand, exhibits a base body connected to a base body of the gun barrel. The base body of the handle member is preferably integrally formed with the base body of the gun barrel 3, e.g. as a monolithic plastic injection-molded part. So doing creates in particular a one-piece spray gun 1 base body.

The gun barrel 3 of the spray gun 1 has a first (anterior or downstream) region extending to a nozzle assembly 8 and a rear second (posterior or upstream) region. It is thereby provided for the handle member 2 to be arranged between the front and rear region, and that specifically in an area in which the handle member 2 is located beneath the center of mass of the gun barrel 3 as a whole. This is conducive to the comfort of the operator of the spray gun 1 when using the spray gun 1, particularly over a relatively long period of time.

The base body of the spray gun 1 is in particular integrally formed from an electrically insulating (polymeric) material.

The coating material 21 to be sprayed, in particular coating powder entrained in a flow of air, is fed to the spray gun 1 from a powder source not shown in the drawings. The flow of the air-entrained coating powder is fed from a coating material supply line through an adapter 14 provided at the lower region of the handle member 2 into a coating material line running through the handle member 2.

Connections 15 for compressed air as well as connections 16 for electrical energy are furthermore provided at the lower end region of the handle member 2.

The exemplary embodiment of the spray gun 1 according to the present disclosure is in particular characterized in that it comprises an illumination device 4 for the continuous or as required illuminating and/or lighting of at least one area of an object 20 to be coated with the spray gun 1.

The illumination device 4 is detachably and in particular replaceably connected to the spray gun 1 and comprises an annular illuminant carrier 5 having at least one illuminant 6, particularly in the form of an LED, and preferably a plurality of illuminants 6, particularly each in the form of an LED.

Figure 2:
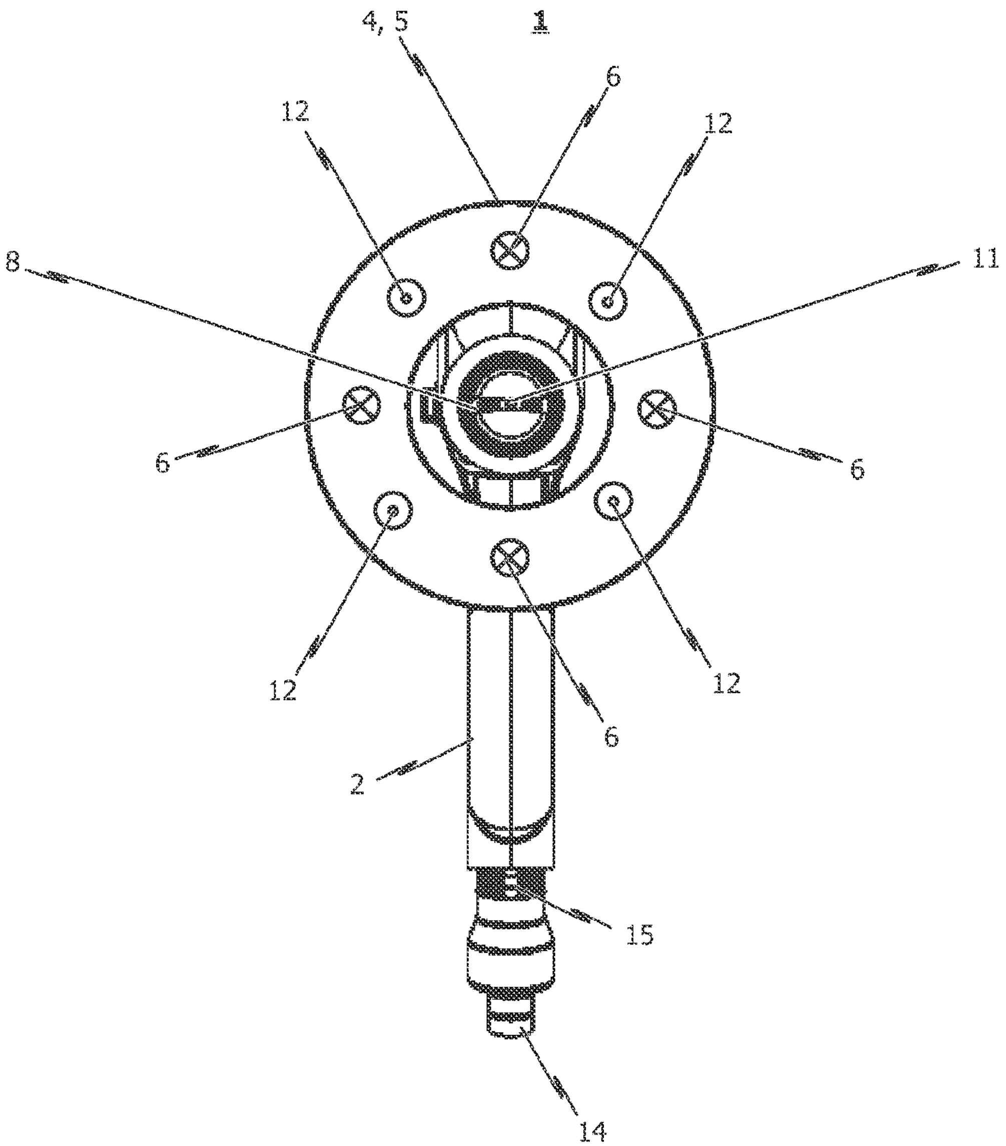
FIG. 2 a schematic view onto the downstream region of the exemplary embodiment of the disclosed spray gun according to FIG. 1.

As can be noted from the frontal top view according to FIG. 2, the illuminants 6 are in particular arranged in equidistant distribution around the annular illuminant carrier 5 and are oriented toward the downstream end region of the gun shaft 7.

The annular illuminant carrier 5 extends around a downstream region of the gun barrel 3 on which it is radially supported.

The exemplary embodiment of the disclosed spray gun 1 shown in the drawings in particular provides for the gun barrel 3 to comprise a gun shaft 7, on the downstream end region of which a nozzle 8 is arranged which is preferably replaceably connected to the gun shaft 7 by means of particularly an at least partially sleeve-shaped union nut 9. It is thereby particularly provided for the area on which the annular illuminant carrier 5 is supported to be an area of the union nut 9 and particularly a sleeve-shaped area of the union nut 9.

To be noted from the side view according to FIG. 1 is that the illumination device 4 furthermore comprises a connecting bar 10 extending longitudinally at least in certain areas of the gun barrel 3 which is connected on one side to the illuminant carrier 5 and is preferably detachably connected or connectable on the other side in particular to an upstream region of the gun barrel 3. The connecting bar 10 extends beyond the gun barrel 3 and at least partially supports the illuminant carrier 5.

The connecting bar 10 preferably forms an electrical connection between an electrical connector 17 and the illuminants 6 of the illuminant carrier 5. To that end, the upstream end region of the connecting bar 10 can be connected to the electrical connector 17 provided for example in the rear casing of the spray gun 1.

The electrical connector 17 is galvanically connected to an adapter 14 preferably provided in the lower region of the handle member 2, or to a connection provided at the lower end region of the handle member 2 respectively, particularly by means of at least one electrical line running at least through parts of the handle member 2.

The object 20 to be coated is usually conveyed by a transport device and transported through a spray coating booth. The transport device is normally grounded such that the object 20 it conveys is also grounded by the transport device.

The exemplary embodiment of the disclosed spray gun 1 shown in the drawings is preferably used for electrostatic spray coating and has at least one charging electrode 11 axially positioned in the powder flow. The charging electrode 11 is located in the outlet area of the nozzle 8 or in the immediate proximity upstream or downstream of the outlet area and is connected to a high-voltage generator which generates an electrical output voltage in the range of between 40 kV and 140 kV. The high-voltage generator can be arranged inside the gun barrel 3 of the spray gun 1 or externally thereof.

The disclosed spray gun 1, as shown schematically in the drawings, makes use of a needle-shaped charging electrode 11 axially located in the powder flow in the outlet area of the nozzle 8. Instead of an axial needle-shaped charging electrode 11 in the outlet area, multiple charging electrodes can also be arranged in or around the center of the coating material 21 flow.

The electrical high voltage generates electric flux lines which run from the tip of the charging electrode 11 to the object 20 to be coated. The powder particles sprayed at the nozzle outlet move along these flux lines onto the object 20 to be coated. In doing so, they also penetrate into recesses of the object 20 to be coated and through openings of said object 20. As a result, the particles even reach the backside of the object 20 due to the "electrical encroachment effect" in its edge regions. Electrostatic interactions result in a greater layer thickness at protruding edges or corners of the object 20 than on raised surfaces or larger flat surfaces of the object 20 to be coated.

In order to nevertheless optimize the coating result, the spray gun 1 shown schematically in the drawings has an annular counter electrode 12 which is arranged together with the illuminants 6 on the annular illuminant carrier 5 or respectively integrated there. The annular counter electrode 12 has a different electrical potential than the charging electrode 11 and serves in drawing off free ions generated during the electrostatic charging of the coating material powder.

The side view in FIG. 1 shows at least one galvanically conductive grounding element 17 integrated into the rear casing of the spray gun 1. The at least one grounding element 17 serves to ground the counter electrode 12 of the spray gun 1 or to set it to a ground potential respectively.

To that end, when the spray gun 1 is in its assembled state, the grounding element 17 integrated in the rear casing can be connected to the counter electrode 12 arranged in the proximity of the charging electrode 11 of the spray gun 1 by means of a ground conductor such as, for example, a galvanically conductive connecting bar 10 in order to connect the counter electrode 12 to an electrical potential which differs from the electrical potential to which the charging electrode 11 is connected. This thereby enables at least some of the free ions generated during the electrical charging of the coating powder to be absorbed via the counter electrode 12 and the grounding element 17 integrated in the rear casing.

The grounding element 17 integrated in the rear casing is thereby preferably connected to ground or a potential terminal in electrically conductive manner by way of an electrical line running inside the handle of the spray gun 1.

The present disclosure is not limited to the exemplary embodiment depicted schematically in the drawings but rather yields from an integrated overall consideration of all the features as disclosed herein.

LIST OF REFERENCE MATERIALS

1 spray gun
2 handle member
3 gun barrel
4 illumination device
5 illuminant carrier
6 illuminant
7 gun shaft
8 nozzle
9 union nut
10 connecting bar
11 charging electrode
12 counter electrode
13 grounding element
14 adapter
15 compressed air connector
16 electrical connector
17 electrical connector/ground connection
20 object
21 coating material

The invention claimed is:

1. A spray gun comprising a handle member and a gun barrel connected to the handle member wherein:

the spray gun further comprises an illumination device for continuously or as required illuminating and/or lighting of at least one area of an object to be coated with the spray gun, wherein the illumination device is detachably and replaceably connected to the spray gun, and wherein the illumination device comprises an annular illuminant carrier having at least one illuminant, in the form of an LED, wherein the illuminant carrier extends around a downstream region of the gun barrel on which it is radially supported, wherein at least one connecting bar extending longitudinally in certain areas of the gun barrel is provided which is connected on a first side to the illuminant carrier and is detachably connected or connectable on a second side to an upstream region of the gun barrel, wherein the at least one connecting bar extends beyond the gun barrel and at least partially supports the illuminant carrier, wherein an electrical connection is formed between an electrical connector and the at least one illuminant of the illuminant carrier by the at least one connecting bar, wherein the electrical connection is an electrical line extending at least through sections of the at least one connecting bar, and wherein the electrical connector is galvanically connected to an adapter provided in the lower region of the handle member by means of an electrical line running at least through sections of the handle member.

2. The spray gun according to claim 1, wherein the gun barrel comprises a gun shaft with a nozzle arranged at its downstream end region which is replaceably connected to the gun shaft by an at least partially sleeve-shaped union nut, wherein an area on which the annular illuminant carrier is supported is a sleeve-shaped area of the at least partially sleeve-shaped union nut.

3. The spray gun according to claim 1, wherein a plurality of illuminants, each in the form of an LED, is provided, wherein the illuminants are arranged in equidistant distribution around the annular illuminant carrier and oriented toward the downstream end region of the gun shaft.

4. The spray gun according to claim 1, wherein a purge air device is provided for flowing compressed air around the illuminant carrier, selectively or as required, so as to keep the at least one illuminant of the illuminant carrier free of coating material.

5. The spray gun according to claim 1, wherein the spray gun has at least one charging electrode for transferring electrostatic charge to the coating material being or to be sprayed with the spray gun, wherein the charging electrode has an electric potential which differs from an electric potential of the object to be coated such that the charged coating material is electrostatically attracted to the object to be coated.

6. The spray gun according to claim 5, wherein the spray gun has at least one counter electrode arranged in a proximity of the charging electrode which is connected to a different electrostatic potential than the charging electrode so that it absorbs at least some free ions generated when the coating material is electrostatically charged, wherein the at least one counter electrode is accommodated by the annular illuminant carrier.

7. The spray gun according to claim 6, wherein at least one connecting bar extending longitudinally in certain areas of the gun barrel is provided which is connected on a first side to the illuminant carrier and is detachably connected or connectable on a second side to an upstream region of the gun barrel, wherein an electrical connection is formed between a potential terminal and the at least one counter electrode by the at least one connecting bar.

8. The spray gun according to claim 6, wherein multiple counter electrodes in the form of needle electrodes protrude from the annular illuminant carrier.

9. The spray gun according to claim 6, wherein a distance between the charging electrode and the counter electrode is smaller than a distance between the charging electrode and the object to be coated.

10. The spray gun according to claim 9, wherein the distance between the charging electrode and the counter electrode is one-third to half of the distance between the charging electrode and the object to be coated.

11. The spray gun according to claim 6, wherein the counter electrode is arranged at a distance from a cloud of coating material atomized by the spray gun, and wherein the distance between the counter electrode and the coating material cloud is smaller than a distance between the charging electrode and the object to be coated.

12. The spray gun according to claim 6, wherein the counter electrode is connected to ground potential.

* * * * *